(12) United States Patent
Kincaid et al.

(10) Patent No.: US 6,663,156 B1
(45) Date of Patent: Dec. 16, 2003

(54) VEHICLE CARGO AREA MAT

(75) Inventors: Mason C. Kincaid, Huntington, WV (US); Alexandra Schmidt, Huntington, NY (US); Brian Ehrlich, Pittsburgh, PA (US); G. Sean Haag, Bridgeville, PA (US); Susan Eitelman, Hampton, VA (US); Yonah Graves, Riverdale, GA (US)

(73) Assignee: Ford Motor Corporation, Dearborn, MI (US)

( * ) Notice: Subject to any disclaimer, the term of this patent is extended or adjusted under 35 U.S.C. 154(b) by 0 days.

(21) Appl. No.: 10/248,907

(22) Filed: Feb. 28, 2003

(51) Int. Cl.[7] ................................................. B60R 5/04
(52) U.S. Cl. .................... 296/39.1; 296/136; 296/97.23; 296/37.14
(58) Field of Search ............................ 296/39.1, 97.23, 296/136, 37.14; 220/495.01

(56) References Cited

U.S. PATENT DOCUMENTS

| | | | | |
|---|---|---|---|---|
| 2,911,253 A | * | 11/1959 | Dewey | 296/39.1 |
| 2,919,141 A | * | 12/1959 | Hughes | 280/727 |
| 3,902,752 A | * | 9/1975 | Pelletier | 296/136 |
| 4,877,281 A | * | 10/1989 | Altmann | 296/39.1 |
| 5,080,417 A | * | 1/1992 | Kanai | 296/37.14 |
| 5,176,421 A | | 1/1993 | Fasiska et al. | |
| 5,195,778 A | * | 3/1993 | Dismuke | 296/136 |
| 5,215,345 A | * | 6/1993 | Orphan | 296/39.1 |
| 5,322,335 A | * | 6/1994 | Niemi | 296/97.23 |
| 5,503,212 A | * | 4/1996 | Lin | 296/136 |
| 5,626,380 A | * | 5/1997 | Elson et al. | 296/39.1 |
| 5,628,542 A | | 5/1997 | Hindson et al. | |
| 5,855,406 A | | 1/1999 | Vargo et al. | |
| 6,196,612 B1 | | 3/2001 | Grimes et al. | |
| 6,290,278 B1 | * | 9/2001 | Loveland | 296/39.1 |
| 6,406,085 B1 | * | 6/2002 | Stanesic | 296/97.23 |
| 6,439,633 B2 | * | 8/2002 | Nemoto | 296/37.14 |

* cited by examiner

Primary Examiner—Stephen T. Gordon
Assistant Examiner—Greg Blankenship
(74) Attorney, Agent, or Firm—Frederick V. Owens

(57) ABSTRACT

A protective mat assembly for preventing undesirable contact between a person and an exterior surface of a vehicle when accessing the vehicle's cargo area as well as protecting the interior cargo space when carrying dirty objects. A folding mat is conveniently stowed in and deployed from its own storage compartment housed in the vehicle's cargo area. The mat can be easily moved between three positions, depending upon the intended use of the vehicle cargo area. In a fully stowed position, the mat is housed substantially within the storage compartment and is out of the way, enabling use of the vehicle cargo area by passengers or to carry relatively clean and large items such as luggage. In a first operative position, the mat is deployed from its storage compartment and extends out through a vehicle opening, draping over the opening as well as adjacent exterior surfaces of the vehicle such as a bumper or sill. In a second operative position, the mat is deployed from its storage compartment but extends entirely within the vehicle to cover an area of the cargo load floor surface to prevent soiling or to better secure smaller objects.

20 Claims, 5 Drawing Sheets

VEHICLE CARGO AREA MAT

BACKGROUND AND SUMMARY OF THE INVENTION

1. Field of the Invention

The present invention relates generally to vehicle cargo area accessories, and more particularly, to a protective mat assembly which protects a person's clothing as well as the interior of the vehicle cargo area when carrying, loading and unloading cargo.

2. Background and Summary of the Invention

The popularity of "multi-purpose" vehicles such as sport utility vehicles (SUVs), minivans, station wagons and crossover versions of these vehicles is due at least in part to the ability of these vehicles to carry various types of cargo in addition to passengers, oftentimes utilizing the same interior space in different ways. Access to the cargo areas of these vehicles is generally provided through any one of a number of different types of vehicle closure panels including sliding side doors, liftgates and double doors. Because these vehicles tend to be relatively large in size, accessing the cargo storage area can sometimes require reaching into the cargo space from outside the vehicle. This can result in contact between a person or his/her clothing and an exterior surface of the vehicle, such as a bumper or sill, which might be wet or dirty.

The present invention provides a unique protective mat assembly for not only preventing such undesirable contact between a person and an exterior surface of the vehicle when loading cargo, but also provides a convenient means for protecting the interior cargo space when carrying dirty objects. It further functions to help prevent smaller items from sliding around when set in a large flat cargo space.

To accomplish this, a folding mat is designed to be conveniently stowed in and deployed from its own storage compartment which is housed in the vehicle's cargo area. The mat can be easily moved between three positions, depending upon the intended use of the vehicle cargo area. In a fully stowed position, the mat is housed substantially within the storage compartment and is out of the way, enabling use of the vehicle cargo area by passengers or to carry relatively clean and large items such as luggage. In a first operative position, the mat is deployed from its storage compartment and extends out through a vehicle opening, draping over the opening as well as adjacent exterior surfaces of the vehicle such as a bumper or sill. In this position, the mat protects people and clothing from contact with exterior vehicle surfaces when leaning or inadvertently brushing against theses surfaces to access the cargo area. In a second operative position, the mat is deployed from its storage compartment but extends entirely within the vehicle to cover an area of the cargo load floor surface to prevent soiling or to better secure smaller objects.

The mat assembly is designed to be adaptable to various types of vehicles including SUVs, minivans and crossovers. It does not reduce the cargo storage capacity, is conveniently stored and is easily deployed. These and other advantages and features of the present invention will become apparent when viewed in light of the description below, taken in conjunction with the attached drawings and appended claims.

DESCRIPTION OF THE PREFERRED EMBODIMENT

Figure 1:
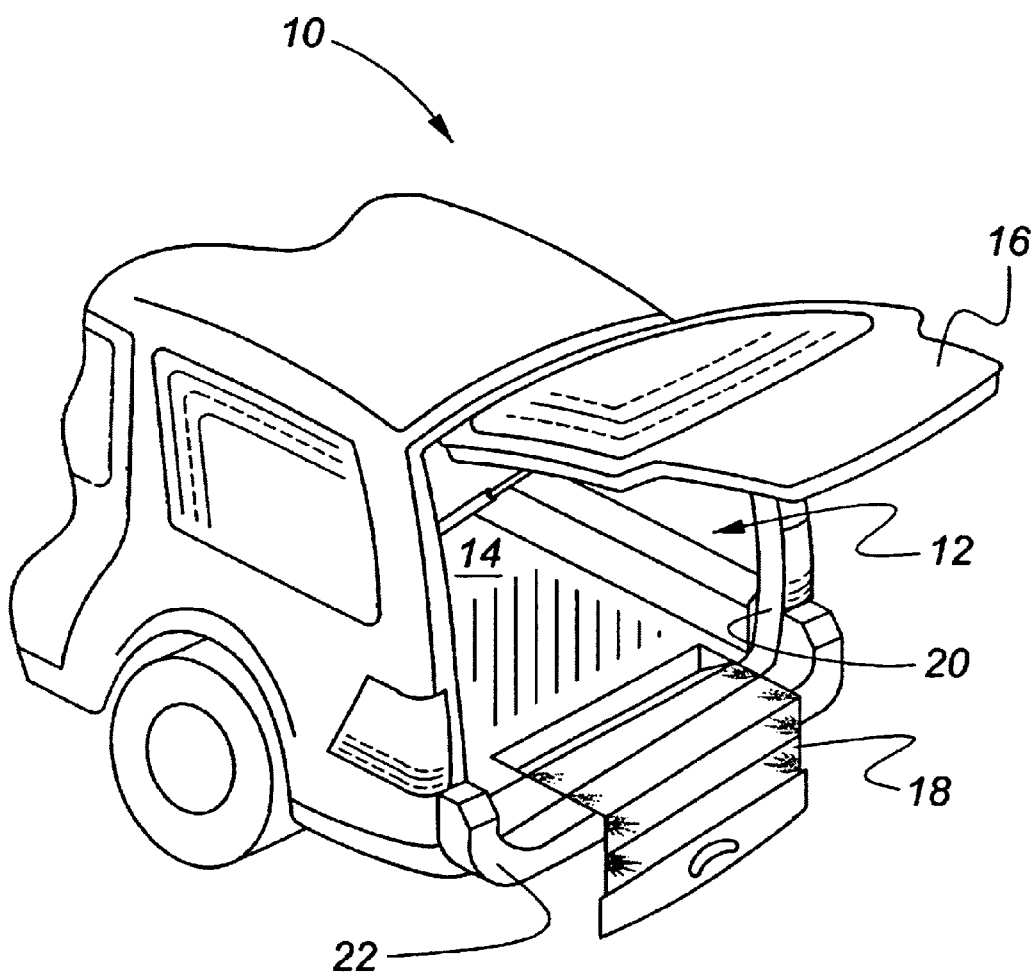
FIG. 1 is a perspective view of the protective mat assembly of the present invention installed in a vehicle and deployed into the first operative position.

Referring now to the drawings, a vehicle having the protective mat assembly of the present invention is indicated generally at 10. While FIG. 1 and the exemplary embodiment described herein are directed to the rear closure area of an SUV or minivan, it should be apparent to one of ordinary skill in the art that the present invention is readily adaptable for use in conjunction with the side door of a van or minivan, a sedan door or other type of vehicle opening.

Vehicle 10 includes therein an interior cargo area indicated generally at 12 and having a load floor 14. Access to cargo area 12 is provided at least in part by a vehicle closure panel 16, such as a liftgate, closure panel 16 being moveable between the open position shown in FIG. 1 and a closed position. In FIG. 1, the protective mat 18 of the present invention is shown extending through an opening 20 created by open closure panel 16 and overlying an exterior surface 22 of the vehicle. Surface 22 generally will lie below closure panel 16 when in a closed position and in FIG. 1 extends outwardly beyond panel 16, thereby increasing the likelihood of inadvertent contact with a person loading cargo into the cargo space 12. Though shown as a bumper in the exemplary embodiment illustrated in FIG. 1, it should be readily apparent to one of skill in the art that exterior surface 22 could be the sill and rocker area when opening 20 is on the side of a vehicle or any of a number of other exterior vehicle surfaces adjacent a vehicle opening.

Figure 2:
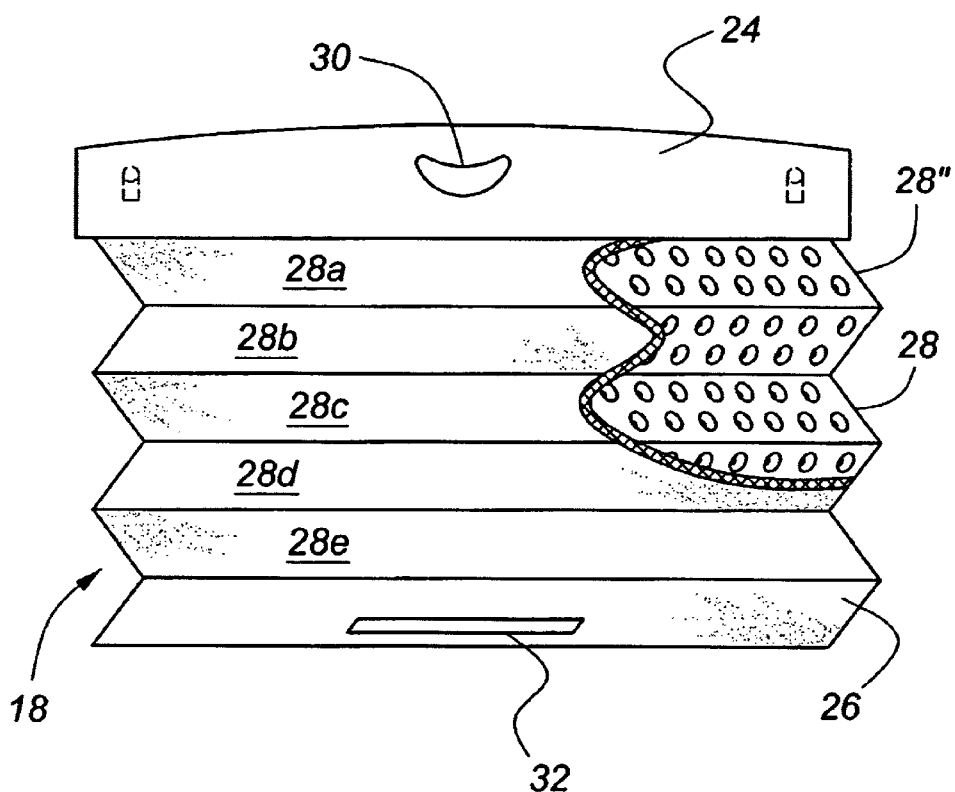
FIG. 2 is a perspective view of the protective mat with a portion cut away.

Protective mat 18 is shown in more detail in FIG. 2 and as can be seen therein, mat 18 is preferably generally rectangular in shape and made up of three adjacent sections, a top cover piece 24, a base segment 26 and a foldable middle section 28 in between. Top cover piece 24 is preferably made of a relatively stiff and lightweight material such as a plastic and preferably matches or coordinates with the interior of vehicle 10. Cover piece 24 preferably includes a handle 30, in the presently preferred embodiment a suitable opening cut through top cover 24, but alternately being an integral or separately attached handle of any other suitable configuration.

Attached along a longitudinal edge of cover piece 24 is foldable middle section 28. To facilitate storage and provide ease of use, middle section 28 is preferably comprised of a number of middle section segments 28a, 28b, and so forth, joined together so as to be foldable accordion style. This could be facilitated by an appropriate scoring of the material forming section 28, by joining stiffer segments 28a, 28b with a flexible material or by any other suitable method.

In the presently preferred embodiment, middle section 28 is made up of at least two layers joined or fused together, the layers forming a smooth surface 28' intended to be the surface contacting a person or clothing when mat 18 is in the first operative position and a non-slip or textured surface 28"

intended to be the surface onto which cargo is placed when mat 18 is in the second operative position extended to cover a portion of load floor 14. In the presently preferred embodiment, smooth surface 28' is made of a fabric or fabric-like material such as a nylon and textured surface 28" is made of a waterproof plastic or rubber-like surface having a texture which provides some degree of friction to prevent small articles from sliding over surface 28" when placed thereon. One of skill in the art will readily appreciate that numerous other materials could be employed to accomplish the same objectives.

The accordion like folding of mat 18 also makes sure that smooth surface 28' only contacts itself when in a-stowed position, the same being true with textured surface 28". In this way, smooth surface 28', being generally clean, will not be soiled by contact with textured surface 28" which may become dirty or wet from protecting cargo floor 14 when carrying dirty or wet items or when contacting vehicle exterior surface 22.

Base segment 26 may be simply an extension of middle section 28, and made of the same materials or may be formed separately and joined thereto. Base segment 26 preferably includes at least one fastener 32 for allowing removable attachment of mat 18 to its storage compartment as described below. Fastener 32 may be one or more hook and loop strips, a series of snaps or any other suitable removable fastening means known to those having skill in the art.

Figure 3:
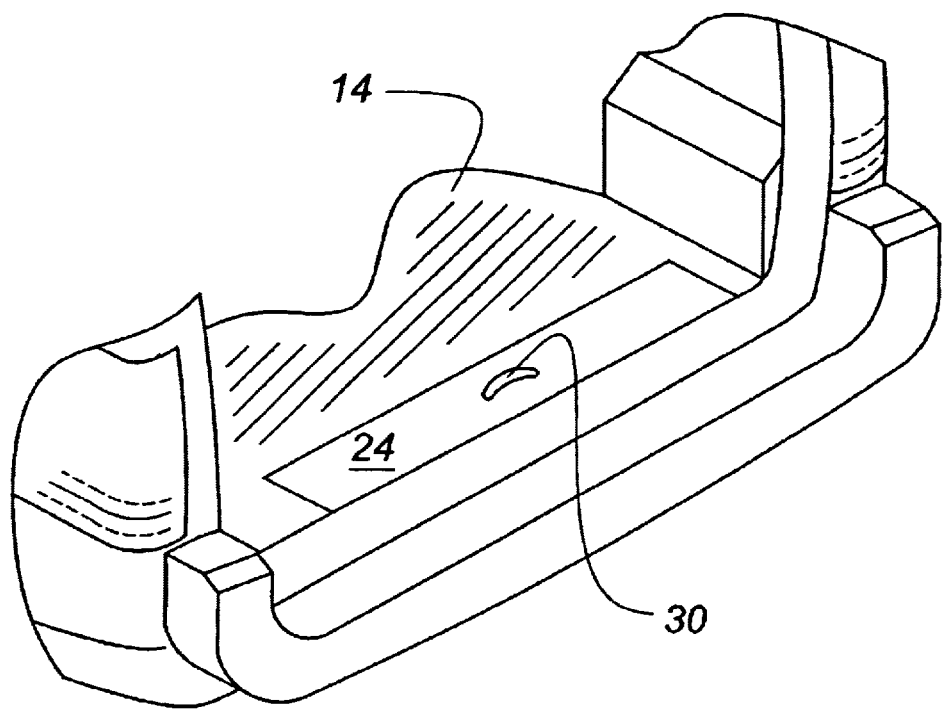
FIG. 3 is a perspective view of the vehicle cargo area showing the protective mat assembly in a fully stowed position.
Figure 4:
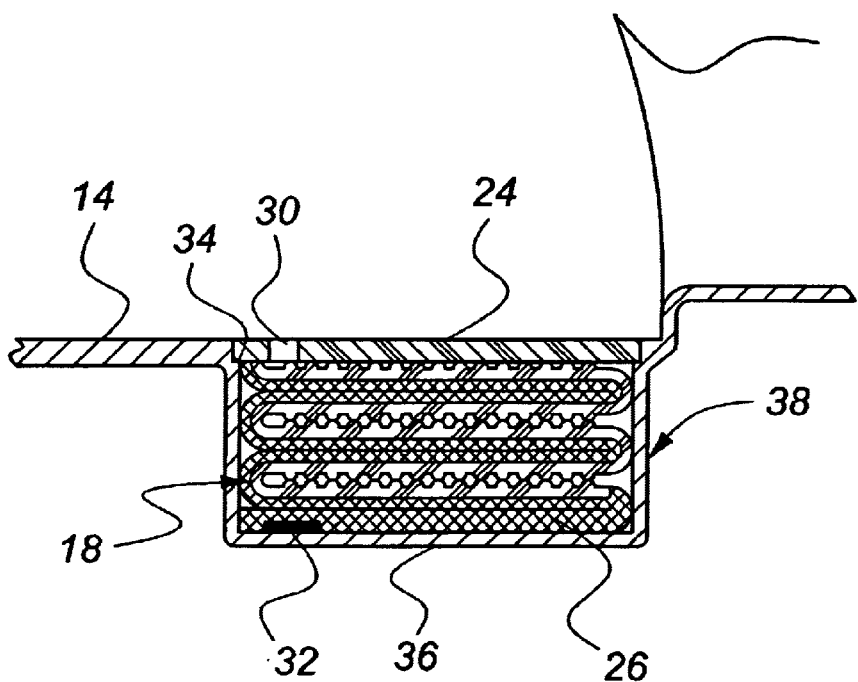
FIG. 4 is a cross-sectional view of the protective mat stowed in its storage compartment.

FIG. 3 shows mat 18 in a fully stowed position under load floor 14 with only top section 24 visible. FIG. 4 also shows mat 18 in the fully stowed position, but in cross-sectional view. As shown therein, top cover 24 fits within an appropriately configured structure, such as a shoulder 34 formed in load floor 14, so as to allow top cover 24 of mat 18 to fit flush with the top surface of load floor 14. One of skill in the art will appreciate that numerous other kinds of configurations and structures including brackets and the like could alternately be employed to retain top cover 24 in a position substantially flush with load floor 14.

Base segment 26 of mat 18 is disposed atop and is preferably removeably attached to a bottom surface 36 of a storage compartment 38. This can be accomplished using fastener 32 described above. Using removable fasteners allows mat 18 to be taken out for cleaning or even to be easily replaced if desired. Storage compartment 38 is preferably disposed to lie beneath load floor 14 and may be integrally formed with or otherwise affixed to the load floor 14. Preferably storage compartment 38 is disposed proximate to and along the bottom of opening 20.

When in the fully stowed position, foldable middle section 28 of mat 18 is folded accordion style to lie atop base segment 26. Top cover 24 is disposed over middle section 28 with handle 30 accessible from the vehicle interior.

Figure 5:
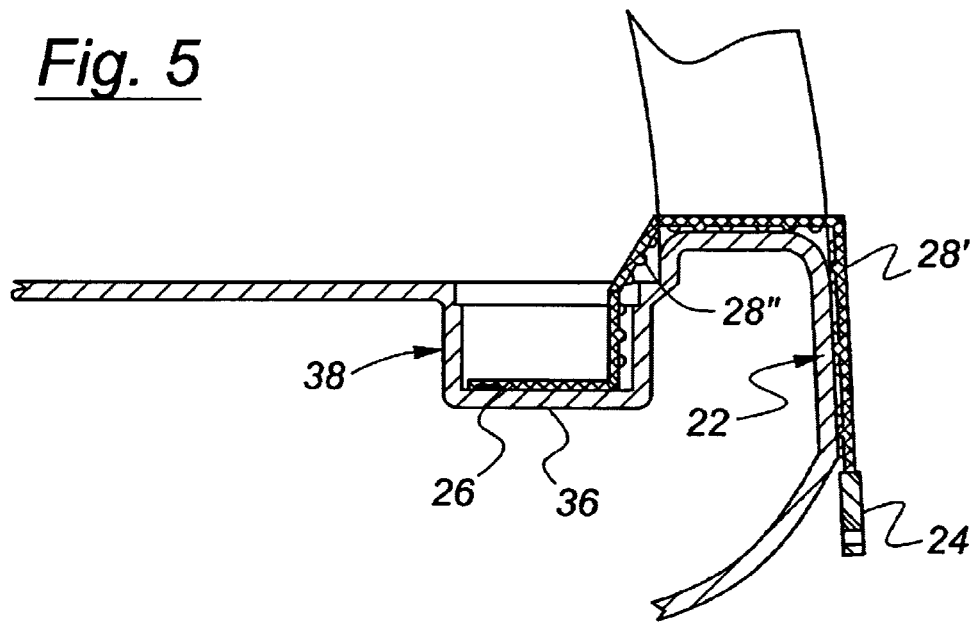
FIG. 5 is a cross-sectional view similar to FIG. 4 of the protective mat in the first operative position.

In FIG. 5, mat 18 has been deployed to a first operative position, substantially overlaying exterior vehicle surface 22 so as to protect a person or his/her clothing in case of inadvertent contact while accessing cargo area 14. As shown therein, base segment 26 of mat 18 remains adjacent to bottom surface 36 of storage compartment 38. Foldable middle section 28 drapes over vehicle exterior surface 22, preferably with smooth surface 28' facing outward. Top section 24 of mat 18 hangs down and provides enough weight to retain mat 18 in this position if there is wind.

Figure 6:
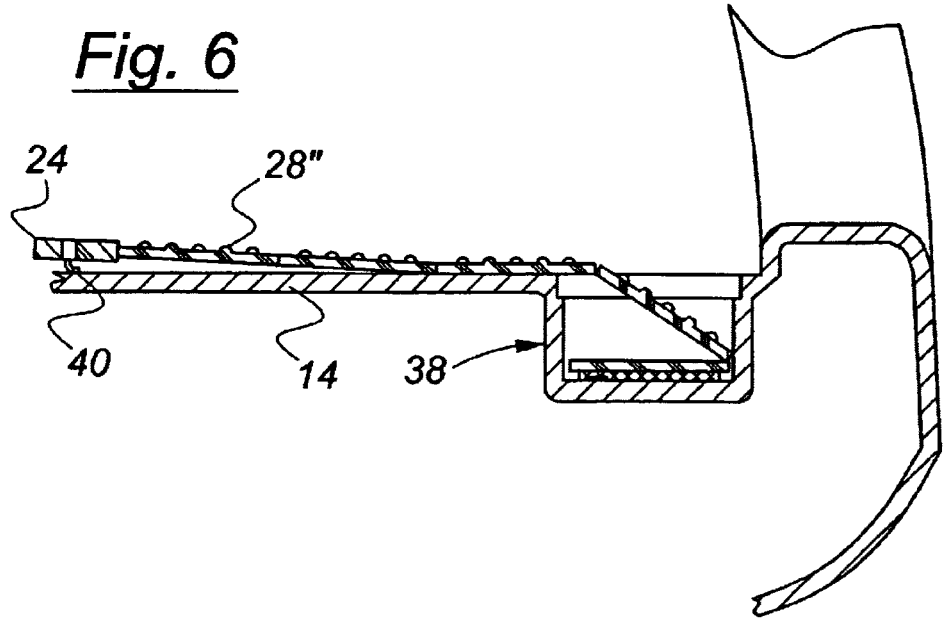
FIG. 6 is a cross-sectional view similar to FIGS. 4 and 5 of the protective mat in the second operative position.

FIG. 6 illustrates the deployment of mat 18 into the second operative position in which mat 18 is deployed from storage compartment 38 and extends inwardly within cargo space 12 to cover a portion of load floor 14. In this position, the textured surface 28" of mat 18 faces upward to help keep small items from sliding around and to keep load floor 14 from being soiled. Preferably, mat 18 is appropriately sized to cover a large portion of load floor 14. While mat 18 in the embodiment is illustrated as being substantially rectangular it should be appreciated by one of skill in the art that it would be feasible to provide cutouts in middle section 28 or otherwise configure mat 18 to fit a load floor having shape constraints such as wheel wells or seat brackets. Optionally, a pair of prongs 40, or other suitable retaining devices, may be used to help secure mat 18 over load floor 14 when in the second operative position. While prongs 40 are especially useful where load floor 14 is carpeted, other designs could be used when load floor is covered with another material or otherwise of a different configuration.

As described herein, it can be readily seen that the protective mat assembly of the present invention provides a convenient means for protecting people and clothing from contact with vehicle exterior surfaces when accessing a vehicle cargo area as well as used to protect the vehicle interior and aid in transporting smaller items in a larger space. While particular embodiments of the invention have been shown and described, numerous variations and alternate embodiments will occur to those skilled in the art. Accordingly, it is intended that the invention be limited only in terms of the appended claims.

What is claimed is:

1. A protective mat assembly for a cargo area of a vehicle, said cargo area including a load floor, a closure panel movable between open and closed positions, and an exterior surface of said vehicle disposed substantially below said closure panel, said protective mat assembly comprising:
   a storage compartment; and
   a mat operatively attached to said storage compartment, wherein said mat is movable between:
   a stowed position disposed substantially within said storage compartment;
   a first operative position extending outwardly through a vehicle opening created when said closure panel in said open position, and draped over said exterior surface; and
   a second operative position extending within said vehicle cargo area and drapedly covering a portion of said load floor.

2. The protective mat assembly of claim 1 wherein said storage compartment is disposed substantially below said load floor.

3. The protective mat assembly of claim 2 wherein said storage compartment is integrally formed with said load floor.

4. The protective mat assembly of claim 1 wherein said storage compartment has a bottom surface and said mat is removably attached to said bottom surface of said storage compartment.

5. The protective mat assembly of claim 4 wherein said mat is attached to said bottom surface of said storage compartment with at least one hook and loop fastener.

6. The protective mat assembly of claim 1 wherein said mat is comprised of three sections, a top cover, a foldable middle section and a base segment.

7. The protective mat assembly of claim 6 wherein said foldable middle section folds accordion style.

8. The protective mat assembly of claim 7 wherein said middle section is comprised of a plurality of segments hingedly connected to one another.

9. The protective mat assembly of claim 6 wherein said top cover is made of plastic.

10. The protective mat assembly of claim 6 wherein said top cover includes a handle.

11. The protective mat assembly of claim 10 wherein said handle comprises an opening cut through said top cover.

12. The protective mat assembly of claim 6 wherein said foldable middle section of said mat has a smooth surface opposite a textured surface.

13. The protective mat assembly of claim 12 wherein said smooth surface of said mat middle section faces upwardly and outwardly when said mat assembly is in said first operative position.

14. The protective mat assembly of claim 13 wherein said textured surface of said mat middle section faces upwardly when said mat assembly is in said second operative position.

15. The protective mat assembly of claim 6 wherein said top cover of said mat lies substantially flush with said load floor when said mat is in said stowed position.

16. The protective mat assembly of claim 15 wherein said storage compartment includes a structure for supporting said top cover in said flush position with said load floor when said mat is in said stowed position.

17. The protective mat assembly of claim 6 wherein said cover includes at least one retainer for securing said top cover to said load floor when said mat is in said second operative position.

18. A protective mat assembly for a cargo area of a vehicle, said cargo area including a load floor, a closure panel movable between open and closed positions, and an exterior surface of said vehicle disposed substantially below said closure panel, said protective mat assembly comprising:

a storage compartment disposed within said cargo area substantially below said load floor;

a mat comprised of three adjacent sections, a top cover, a foldable middle section and a base segment; and a fastener for removably attaching said mat base segment to a bottom surface of said storage compartment.

19. The protective mat assembly of claim 18 wherein said mat is movable between:

a stowed position disposed substantially within said storage compartment;

a first operative position extending outwardly through a vehicle opening created when said closure panel in said open position, and draped over said exterior surface; and a second operative position extending within said vehicle cargo area and drapedly covering a portion of said load floor.

20. The protective mat assembly of claim 18 wherein said storage compartment includes a structure for supporting said top cover in a position substantially flush with said load floor when said mat is stowed within said storage compartment.

* * * * *